United States Patent
Cormack (10) Patent No.: US 8,418,914 B2
(45) Date of Patent: Apr. 16, 2013

(54) METHOD AND SYSTEM FOR IDENTIFYING AND TRACKING REUSABLE PACKING CRATES

(76) Inventor: Cameron Lanning Cormack, Edmonton (CA)

( * ) Notice: Subject to any disclaimer, the term of this patent is extended or adjusted under 35 U.S.C. 154(b) by 131 days.

(21) Appl. No.: 12/860,859

(22) Filed: Aug. 21, 2010

(65) Prior Publication Data
US 2011/0042452 A1 Feb. 24, 2011

(30) Foreign Application Priority Data
Aug. 24, 2009 (CA) .................................... 2676009

(51) Int. Cl.
*G07F 19/00* (2006.01)
(52) U.S. Cl.
USPC .......................................... 235/375; 235/383
(58) Field of Classification Search .................. 235/375, 235/381, 383, 385, 445, 458, 462.09
See application file for complete search history.

(56) References Cited

U.S. PATENT DOCUMENTS

| | | | | |
|---|---|---|---|---|
| 5,065,507 A | * | 11/1991 | Wakamori et al. | 29/888.1 |
| 5,646,389 A | * | 7/1997 | Bravman et al. | 235/385 |
| 2004/0099724 A1 | * | 5/2004 | Ulrich et al. | 235/375 |

* cited by examiner

*Primary Examiner* — Karl D Frech
(74) *Attorney, Agent, or Firm* — Parlee McLaws LLP; Jean Macheledt (57) ABSTRACT

A method and system is provided for permanently and visibly marking reusable packing crates with a unique mark and using the mark to identify and track the crate in a manufacturing environment. The mark can include a two-dimensional barcode comprised of holes drilled through one or more sidewalls of the crate to produce a unique and permanent pattern for identification. The code can be used to identify a crate uniquely and to assign waypoint data, process management data and content data that can be stored in a computer database. The data can be used for tracking information capabilities and business intelligence in and for manufacturing management systems.

28 Claims, 8 Drawing Sheets

METHOD AND SYSTEM FOR IDENTIFYING AND TRACKING REUSABLE PACKING CRATES

TECHNICAL BACKGROUND

In most manufacturing and packaging facilities, multiples of finished products are often packed into a cardboard case. The case is permanently marked with pre-printed artwork, labels, inkjet printers, or lasers to identify the contents of the case. Often, variable data is also applied to the case that indicates other important information such as batch number, lot codes, date codes, time codes, case contents, barcodes, and facility information. This information can be collected at various locations throughout the manufacturing process by means of Automatic Identification and Data Capture systems. The captured data can be used in Operations Execution Systems such as manufacturing execution, warehouse management, and supply chain management to name but a few. Not only is this marked data helpful to the manufacturer and customer, but is sometimes required for public health and safety.

Once the case of product is consumed by the customer, the cardboard exterior is often discarded along with all of the markings. The function of the case and its markings has served its purpose therefore disposal is an acceptable outcome at this point in the lifecycle of the packaging. Direct reuse of the cardboard case is not feasible as it was permanently marked with data that would be no longer valid for other contents of product. This type of case is referred to as a one-time-use case.

In some industries, an effort is made to reduce packaging costs by using reusable packing cases or crates that can be made of various materials including, but not limited to, plastic. One such industry is the milk products industry although it is obvious to those skilled in the art that such packing crates can be used in other industries for the storage, cartage and distribution of other products. Typically, a packing crate can be reused hundreds of times before reaching the end of its lifecycle thus is referred to as a multi-use or reusable case. An industry standard crate design can be used to hold various types of products. It is difficult to mark the packing crate in the same way cardboard cases are marked due to the design and material of the crate as well as its reusability.

There are three obstacles to marking a packing crate: physical restrictions of existing marking technologies, cost, and variability of data to mark. This inability to mark the packing crate with relevant information about the current contents leaves product manufacturers at a strategic disadvantage over the one-time-use cardboard case systems employed in other industries.

If one were to permanently mark the contents of the crate on the exterior sides of the crate, then the crate could not be used for all products and variable data marking would not be available. If one were to temporarily mark the contents of the crate on the exterior sides of the crate, then the crate could not be reused as current techniques for removable markings are not consistent and feasible. Removable markings would be labels and ink based solutions. Because of these limitations the only feasible approach to marking a crate is to permanently mark a unique identifier, and then associate the contents and variable data to the unique identifier in a database.

There are two well known techniques to permanently mark packing crates. A crate can be mechanically tagged with a Radio Frequency Identification, called RFID, chip or with using an industrial laser marking device. The RFID chip is expensive and is met with strong resistance from some manufacturers based on cost considerations. RFID technology also has limitations with respect to effective reading when placed around liquids. As most of the crate contents in the milk industry, as an example, are liquid products, the effectiveness of RFID as an identification technology can be diminished. In some cases, a RFID tag can become dislodged from the crate due to the harsh handling of the packing crate during normal wear and tear.

The alternative method is with laser marking of the plastic. Unfortunately laser marking of plastics is not a consistent method. The formulation and color of the plastic changes the effectiveness of the laser marking process. Millions of existing crates are in active circulation and effectiveness of laser marking on these crates would be a large uncertainty for a manufacturer.

Laser marking marks the surface of plastic with minimal penetration into the body of the material. This means that the entire mark exists only on the outer surface of the crate. Packing crates often experience harsh handling and scratching of the surface. A laser mark can be easily damaged by such a scratch thus rendering the accuracy of the laser mark unacceptable. Therefore both laser marking and RFID methods are either too costly or too ineffective at producing robust and easily readable identifications.

Milk product manufacturers, as an example, have not adopted any of the prior art identification methods, therefore plastic packing crates are not uniquely identifiable. This also implies that the milk product manufacturer is unable to track crated product through its manufacturing process. In addition, the manufacturer cannot determine the contents of a packing crate once it is packed without an employee looking inside the crate and manually recording it. Without the ability to identify the contents of the crate from the outside of a crate, in a machine readable format, then limited mechanical automation can be implemented to handle logistics of the reusable plastic packing crates within the manufacturing process.

Another inability of product manufacturers is the accurate recording of final destination for specific product outside their organization, also referred to as "track and trace". Without the ability to uniquely identify a crate of product, the manufacturer cannot correlate shipping data to specific product. This would be helpful for product manufacturers to recall product from specific end users without having to do a recall from all customers.

It is, therefore, desirable to provide a method and system for identifying and tracking reusable packing crates that overcomes the shortcoming of known prior art solutions for identifying and tracking such packing crates.

SUMMARY

A method and system for uniquely identifying and tracking reusable packing crates is provided. In some embodiments, a packing crate can be given a unique identifier code that can be applied to the packing crate. In some embodiments, this process can eliminate all material costs for the unique identifier code, thus overcoming the cost drawbacks of ink, label, and RFID methods.

In some embodiments, the unique identifier code can comprise a pattern of drilled holes on at least one side of the packing crate, which can be comprised of plastic although other materials as obvious to those skilled in the art can be used. These holes cannot be reasonably removed from the crate thus overcoming the permanency limitations of ink, labels and RFID tags. In addition, the contrast achievable for optical inspection can be high due to the fact that the holes are spots of absent material thus always producing a contrast with the remaining material, regardless of the material, color and composition of the packing crate. Removing the material by means of drilling eliminates the visible contrast limitations of laser marking. Black plastic reflects more light than a void, therefore lighting conditions can be achieved to produce marking contrast visibility for the drilled holes. Surface scratching would yield insignificant alteration to the drilled mark pattern since the holes penetrated all the way through the packing crate wall.

The holes can be drilled with a computer numeric controlled, called CNC, machine with a spindle and an attached drill bit. The CNC drilling machine can drill patterns that represent unique serial numbers for the packing crates. The drilled pattern can be produced on one or more sides of the crate allowing identification from any side.

In some embodiments, a computer system comprising a database of all possible serial numbers can be maintained to keep track of the serial numbers that have or have not been used in crate marking as well as other pertinent information about the crates. This database can be used to determine the patterns that the CNC drilling machine will create. The unique identifier code or mark can be optically visible and can be read through known methods of two dimensional barcode reading. New and existing packing crates, equally, can each have a unique drilled pattern applied as the material or color of the packing crate have no significance on the ability to produce or read the code. In some embodiments, all of the elements of the unique mark can be circular in shape and solid in appearance. Such a circular solid shape is called a dot. This would eliminate the use of barcode technologies that cannot use dot marks solely in the pattern. In some embodiments, the unique identifier code applied to the packing crate can comprise other two-dimensional symbologies as well known to those skilled in the art. Example of such other symbologies can include a Data Matrix (as disclosed in U.S. Pat. No. 5,464,974 issued to Priddy et al. on Nov. 7, 1995) or a Dot Code A (as disclosed in U.S. Pat. No. 4,745,269 issued to Gils on May 17, 1988).

In some embodiments, optical barcode readers can be placed at various strategic locations within the product manufacturing process. The optical barcode reader can be electronically coupled to a computer driven database. Any packing crate passing an optical barcode reader can produce a log entry into the database, which can be correlated to or associated with specific data regarding the identification of the packing crate, the stage of the manufacturing process depending on where in the manufacturing process the packing crate has been identified and the product(s) contained in the packing crate. In some embodiments, other manufacturing processes can use the optical barcode reader to identify the crate's unique code and recall stored information about the crate from the coupled database. The recalled data can then be used for routing or other automated processes where the content of the crate is relevant.

In some embodiments, a computer terminal can be coupled to the database to provide an access point for independent queries of the crate data. In other embodiments, management computer systems can be coupled to the database to provide the ability to query the data and to produce information relevant to the manufacturing process.

In some embodiments, an optical barcode reader can be positioned at order fulfillment stations to produce database records that can associate crate identification with specific customer details. The association can then provide a means of tracking specific product forward and backward in the distribution of the products distributed in any given packing crate.

Broadly stated, in some embodiments, a method is provided for identifying and tracking a reusable packing crate for carrying products, the method comprising the steps of: applying a unique identifier code on at least one sidewall of the crate; reading the identifier code; storing the identifier code in a computerized database; storing data relating to the crate and the products contained therein on the database; and associating the stored data with the identifier code.

Broadly stated, in some embodiments, a system is provided for identifying and tracking a reusable packing crate for carrying products, comprising: means for applying a unique identifier code on at least one sidewall of the crate; means for reading the identifier code; means for storing the identifier code in a computerized database; means for storing data relating to the crate and the products contained therein on the database; and means for associating the stored data with the identifier code.

BRIEF DESCRIPTION OF DRAWINGS

In the drawings, which form a part of this specification.

DETAILED DESCRIPTION OF EMBODIMENTS

The following is a detailed description of the embodiments of a method and system for identifying and tracking reusable packing crates, as shown in the attached Figures. Wherever possible, the same reference numbers shall be used throughout to refer to the same or similar elements.

Figure 1:
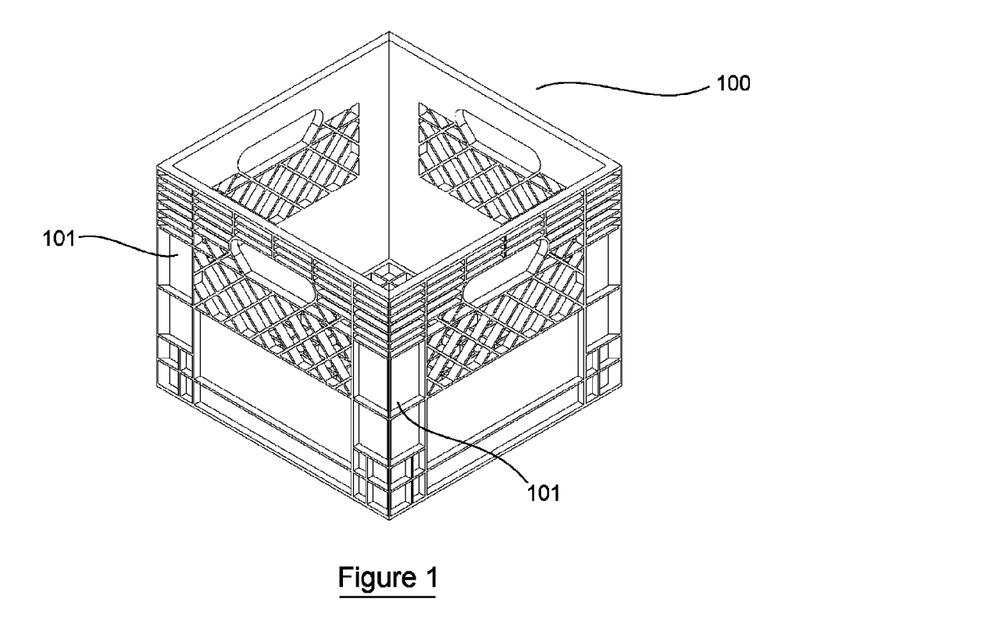
FIG. 1 is a perspective view of a typical reusable plastic packing crate.

FIG. 1 illustrates a typical plastic reusable packing crate 100. In this illustrated embodiment, packing crate 100 can comprise the industry dimensional standard as used in the milk industry. It is known by those skilled in the art that crates from different manufacturers may differ slightly in structural layout of the side and bottom panels as required or desired in any particular industry, but the spirit of the crate design remains constant. It is further known by those skilled in the art that methods and systems described herein can be used in any industry where products can be stored, carted or distributed in a reusable packing crate, and that such methods and systems are not limited for use solely in the milk industry.

The composition and color of the material of which the packing crate can be made of is not relevant, as these elements have no bearing on the method described herein. Typical packing crates 100 can comprise side designs that can further comprise structural gusset areas 101, which can be flat and provide space for a two-dimensional barcode.

Figure 2:
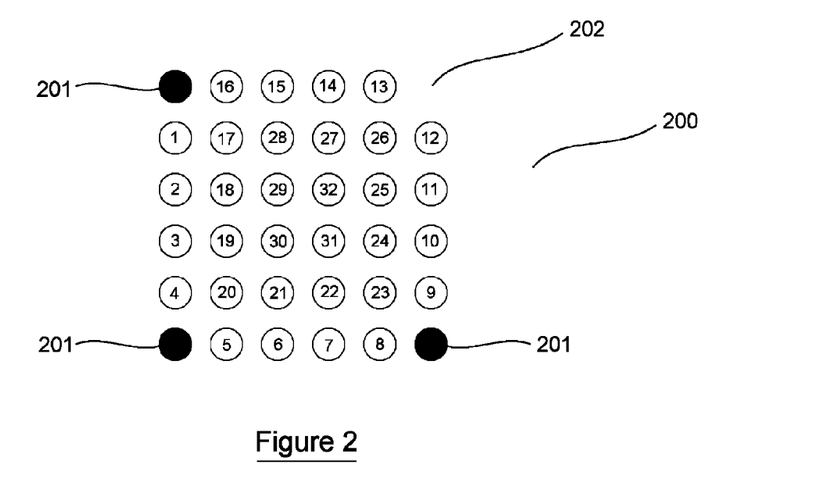
FIG. 2 is a front view of an embodiment of a two-dimensional code in which the protocol of the code is depicted.

FIG. 2 illustrates one embodiment of a simplistic two-dimensional barcode layout 200 comprised of columns and rows, which can define the marking field. This embodiment can be comprised of three dots 201 in the corners of the matrix that can be used for registration of the field of the barcode. The fourth corner 202 can remain empty as an orientation indicator for the registration design. The remaining thirty-two dots can be representative of binary data bits. The Figure details one embodiment of the bit location as numbers in the circles. The decimal value of the barcode as illustrated in FIG. 2 can be zero or can otherwise be expressed as a thirty-two bit binary value: "00000000000000000000000000000000".

Figure 3:
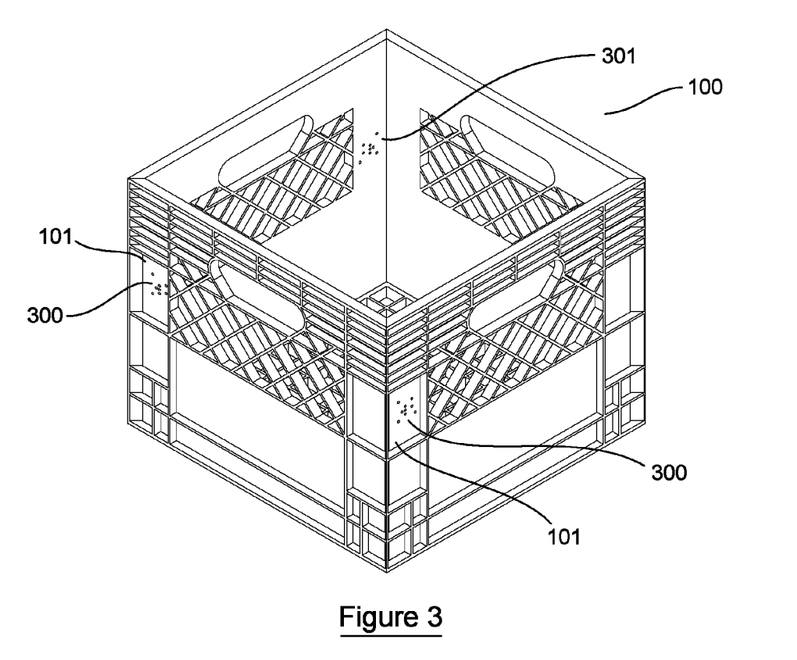
FIG. 3 is a perspective view of FIG. 2 with a two-dimensional code drilled into each side.

FIG. 3 illustrates one embodiment of a typical packing crate 100 comprising two-dimensional barcode 300 drilled into structural gusset 101. The drilled holes that comprise the barcode marking method can pass completely through the gusset material and leave a reversed pattern on the inside 301 of the crate. Barcode pattern 300 can be drilled on one or more of all four sides of crate 100 to increase access to barcode 300.

In some embodiments, a CNC drilling machine, by means of a drill bit or end mill, can effectively pierce the sidewall of crate 100 to produce the required through holes. Alternately, other CNC machines such as a CNC laser cutter and CNC punching machine are also capable of producing said through holes. The method the different types of CNC hole making machines use can differ, but the spirit of the hole making process remains the same. Said machines are capable of removal of material to produce a circular hole clear through the sidewall of crate 100. For the purposes of this specification, and the claims herein, the terms "drilling" and "drilled" shall refer to all of the methods described above to produce a hole through the sidewall of crate 100, and all other methods known to those skilled in the art to produce such a hole. It is also obvious to those skilled in the art that holes that are not circular in shape can be used to produce the two-dimensional barcode described herein. In some embodiments, an alternate barcode symbology can be such as Data Matrix (as disclosed in U.S. Pat. No. 5,464,974 issued to Priddy et al. on Nov. 7, 1995) or Dot Code A (as disclosed in U.S. Pat. No. 4,745,269 issued to Gils on May 17, 1988), to name but a couple of examples.

Figure 4:
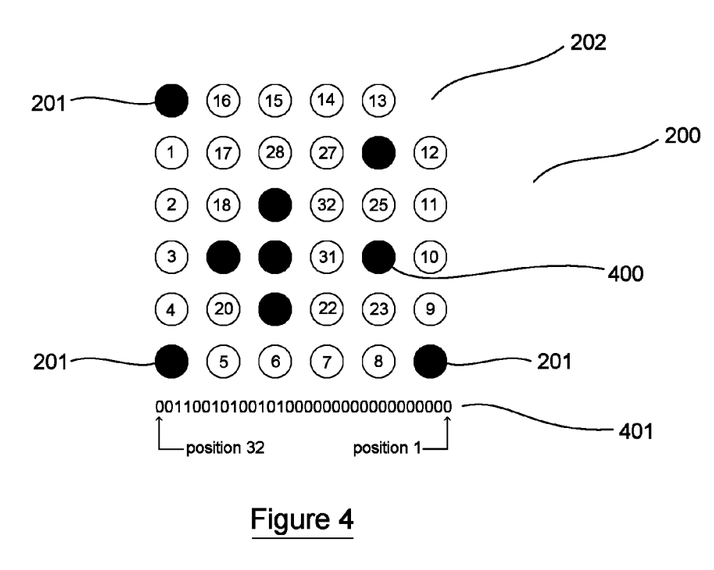
FIG. 4 is a front view of FIG. 2 depicting an alternate embodiment of a two-dimensional code in which a unique pattern is demonstrated.

FIG. 4 illustrates one embodiment of barcode layout 200, as depicted in FIG. 3. The drilled holes in FIG. 3 are depicted as filled circles 400 in FIG. 4. Bit locations nineteen, twenty-one, twenty-four, twenty-six, twenty-nine and thirty represent a logic high state while the remaining bits are a logic low state. The binary representation 401 of the marked data can be expressed as a decimal number "848,560,128". Therefore, FIG. 3 depicts packing crate 100 comprising serial number "848,560,128".

Figure 5:
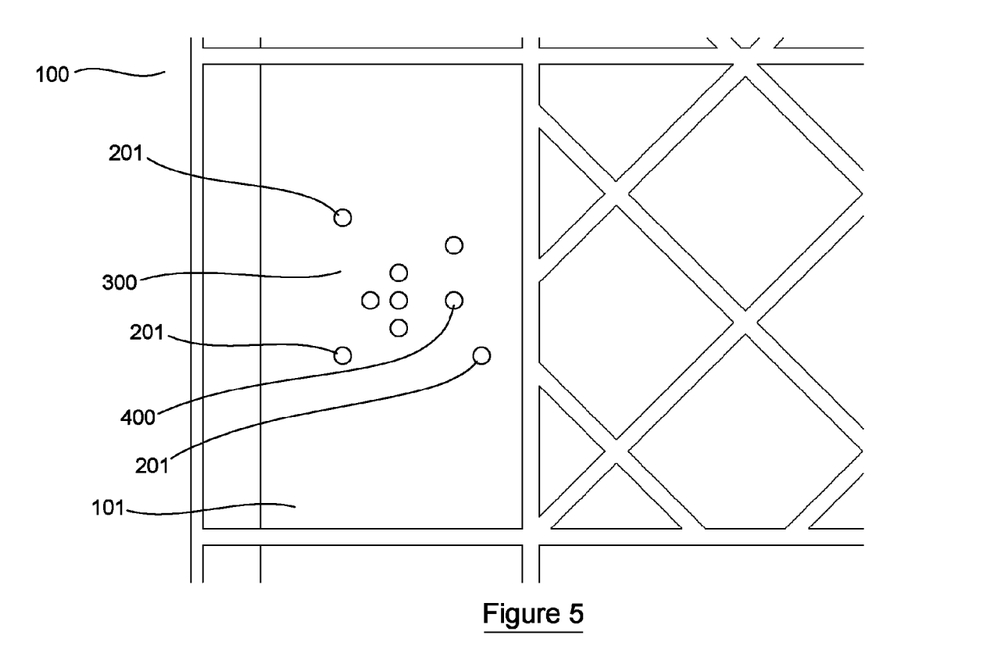
FIG. 5 is a close-up front view of FIG. 3 depicting the drilled identification pattern in the sidewall of the crate.

FIG. 5 is a close-up illustration of one embodiment of gusset area 101 of FIG. 3. It is clearly visible that the barcode pattern 300 of FIG. 5 matches barcode layout 200 of FIG. 4.

Figure 6:
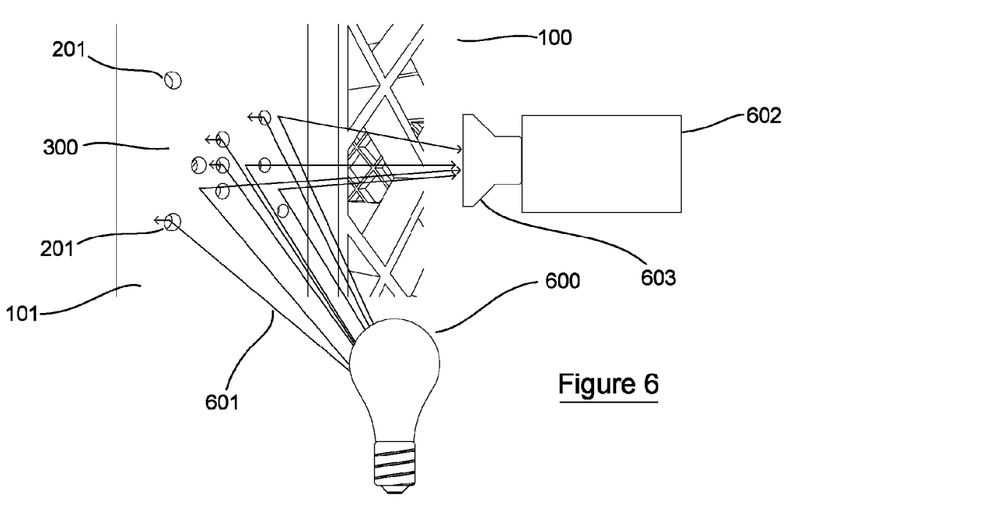
FIG. 6 is a close-up front view of FIG. 3 depicting the interaction of light and optical contrast on the drilled identification pattern in the plastic wall of the crate as seen by an optical barcode reader.

FIG. 6 is a perspective view further illustrating one embodiment of gusset area 101 of FIG. 3. FIG. 6 illustrates one embodiment of the method of producing visible contrast between the plastic of crate 100 and drill holes 400 of barcode 300. Light source 600 can shine light rays 601 onto the outside surface of crate 100. Light rays 601 that strike the plastic surface can be reflected into lens 603 of optical barcode reader 602. Rays of light 601 from light source 600 that strike the drilled holes of barcode 300 are not reflected into lens 603. Thus, an optical pattern can be created by means of contrasting reflected light 601 from the surface of crate 100.

In some embodiments, light source 600 can emit light energy in the visible light spectrum, that is, light having a wavelength in the 400 nm to 700 nm range. In other embodiments, light source 600 can emit light energy in the non-visible infrared light spectrum, that is, light having a wavelength greater than 700 nm. Long wavelength infrared light can provide a strong contrast between light reflected off of crate 100 and the light that passes through holes 400 of barcode 300. In these embodiments, optical barcode reader 602 is configured to be sensitive to the wavelength of light being used and read the reflected light off of crate 100 so as to read barcode 300.

Figure 7:
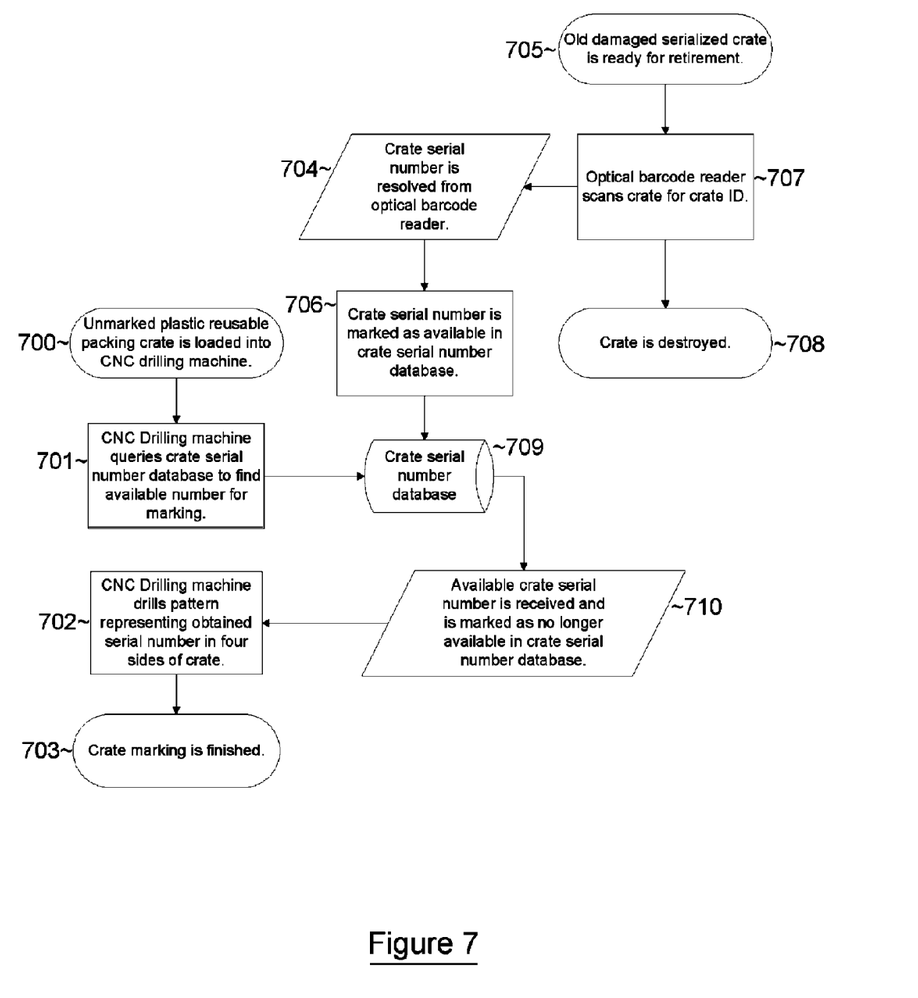
FIG. 7 is a flowchart depicting the process of assigning and recovering serial numbers for use in marking plastic reusable packing crates.

The flowchart of FIG. 7 demonstrates one embodiment of the process of creating new barcodes 300 on unmarked crates 100 and the recovery of serial numbers from barcode marked crates (step 703) destined for disposal (step 705). Each crate 100 requires a unique barcode 300 in order to be identified uniquely. Therefore, a serialized barcode 300 can only exist once in the group of crates in active circulation. A serial number database (step 709) can be used to store information pertaining to the use of the serial number. If an unused serial number is requested by the CNC drilling machine (step 701) from said database (step 709) then permission can be given to use the serial number and said serial number database (step 709) can be updated to indicate that said serial number is in use and is not available for reuse as indicated by step 710. Upon receiving a usable serial number at step 710, the coupled CNC drilling machine can mark crate 100 as indicated in step 702.

When crates 100 are no longer usable, they can be discarded. In order to limit the use of new serial numbers, one embodiment of a method is illustrated in FIG. 7 for recovering serial numbers from crates destined for disposal at step 705, and allowing the serial numbers to be reused on unmarked crates. Coupled optical barcode reader 602 can record serial numbers (step 704) of crates 100 destined for disposal. The serial number database (step 709) can be updated to reflect availability of the serial number at step 706. The scanned crate (step 707) can then be destroyed at step 708.

Figure 8:
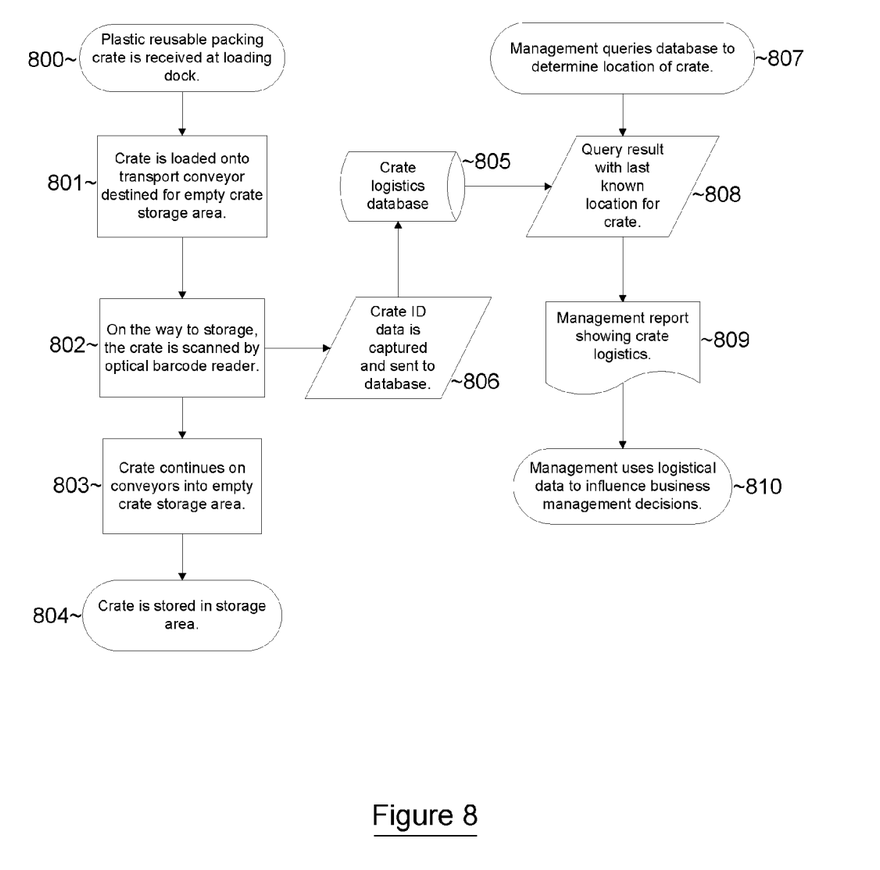
FIG. 8 is a flowchart depicting the process of using the identification mark to track the crate.

FIG. 8 is a flowchart illustrating one embodiment of a method for tracking a packing crate within the manufacturing process and using data from said tracking to affect business management. Optical barcode reader 602 (as shown in FIG. 6) can be affixed in proximity to passing crates 100 on a conveyor at step 801. Optical barcode 602 can read the crates, can captures unique identifier data at step 802 and can further create records (step 806) of said data in a coupled computerized database at step 805. In some embodiments, the location of said optical barcode reader can be known, therefore, positional and process data (step 808) can also be associated in said database to said unique identifier. A further process of management compiling reports (step 809) from said data can be utilized to influence operational management decisions at step 810.

Figure 9:
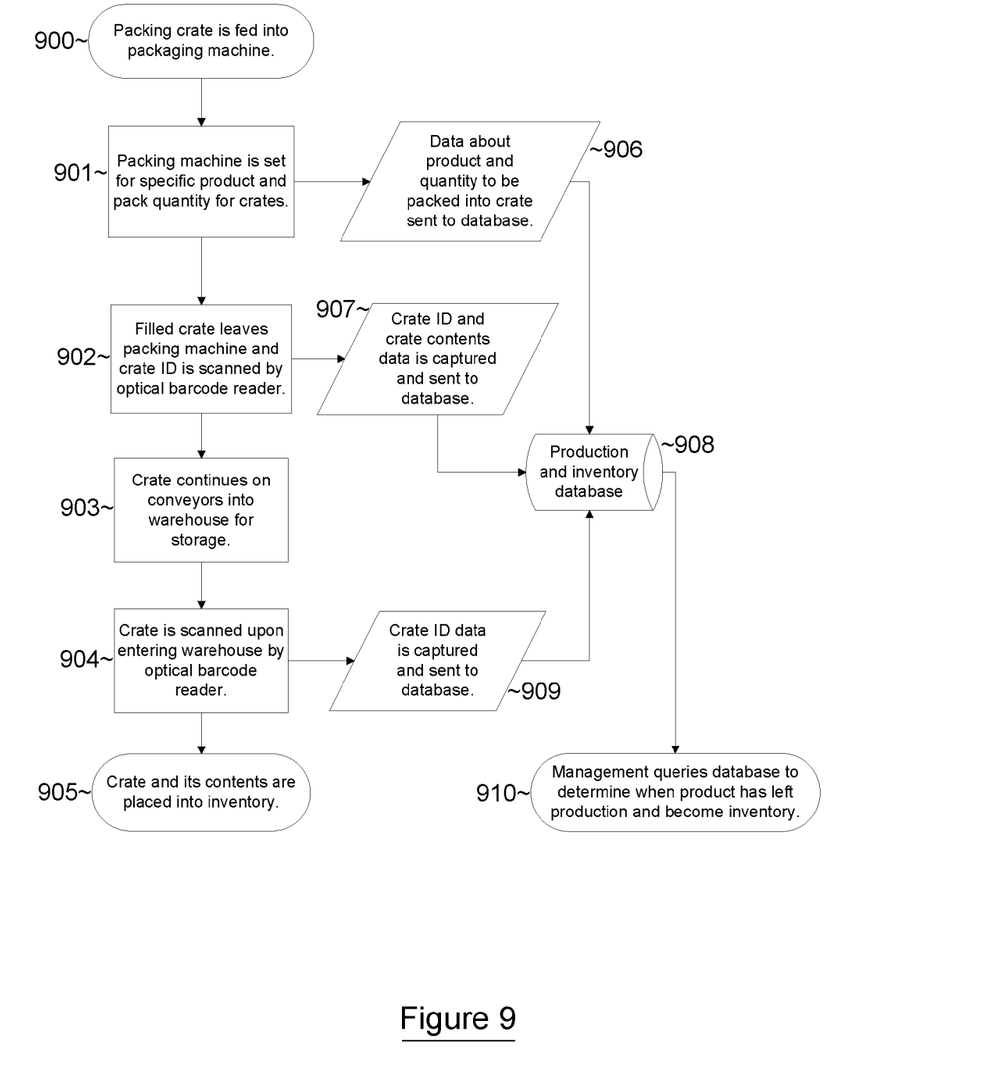
FIG. 9 is a flowchart depicting the use of the unique identification mark to identify the crates content and the use of said information to transition ownership of product from one business unit to another within the same firm.

FIG. 9 is a flowchart illustrating one embodiment of a method for identifying the contents of a packing crate by means of tracking. In some embodiments, the content data and tracking data of the crate can be used to manage inventory levels of different business units within the firm. Optical barcode reader 602 can be affixed in proximity to passing crates exiting a packing machine. Optical barcode reader 602 can read the crates, can capture unique identifier data (step 902) and can further create records (step 907) of said data in a coupled computerized database at step 908. In some embodiments, the packaging machine can be coupled to computerized database at step 908, where settings data can be recorded (step 906) in said database at step 908. An association can be established in said computerized database (step 908) between the unique identity of said crate exiting the packing machine (step 907) and settings of said packing machine indicating product and pack quantity (step 906). Therefore, data captured from the packing machine and the crate identification data captured from the exit of the packing machine, by means of optical barcode reader 602, can create a direct correlation between a specific crate and the contents therein. Furthermore, successive optical barcode readers (step 904) located elsewhere in the factory can identify said crate and record time, crate identity, and positional data (step 909) to a coupled computerized database (step) 908. In some embodiments, a query (step 910) of said databases (step 908) by crate identity can produce a correlation of product, determined by crate content, and location determined by crate tracking. Thus, the flow of product can be tracked from one business unit to another within the manufacturing environment (step 910).

Figure 10:
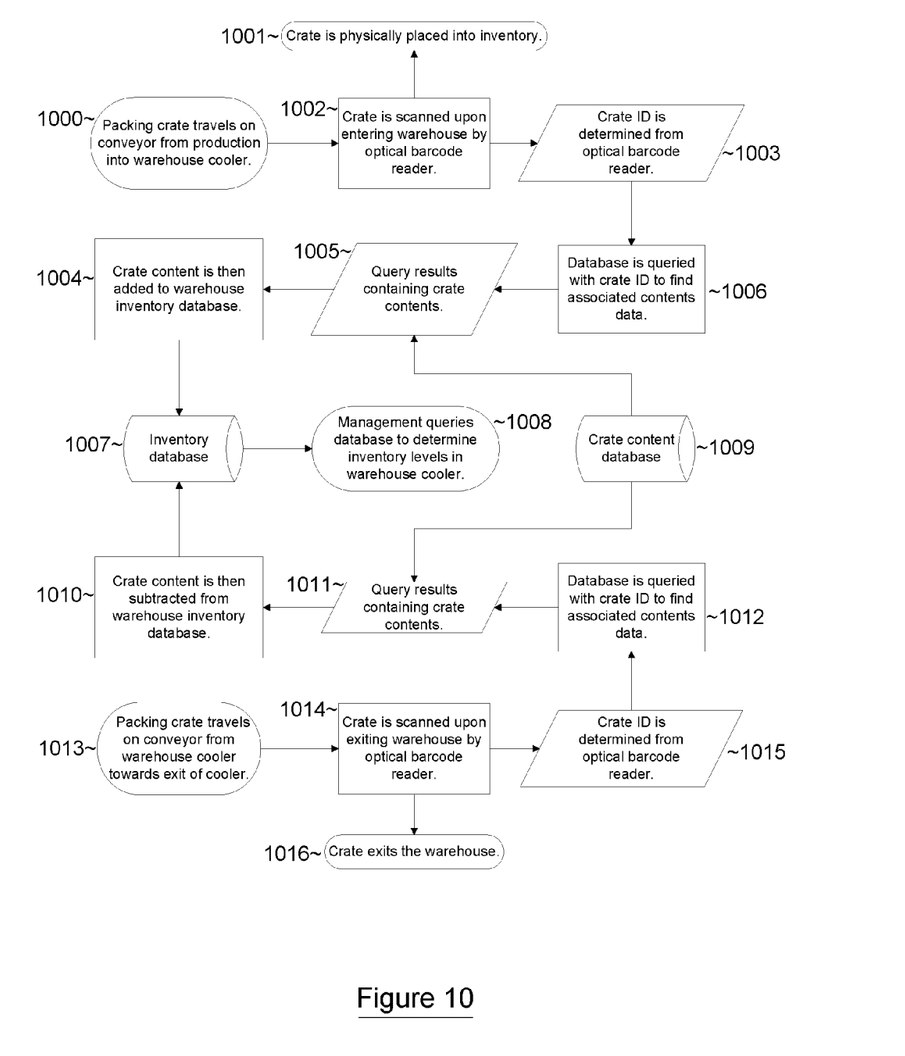
FIG. 10 is a flowchart depicting the process of using crate identification and tracking methods to automatically record inventory levels.

FIG. 10 is a flowchart illustrating one embodiment of a method for tracking inventory levels of a specific storage location. The method can comprise the process of affixing optical barcode reader 602 in proximity of all entrances (step 1002) and exits (step 1014) of said storage location. Each optical barcode reader can read the crates, can capture unique identifier data and can further create records of said data in a coupled computerized database (step 1007). In some embodiments, the database can be coupled to the packing machine and to optical barcode reader 602 located in proximity of the packing machine exit (as disclosed in the process flowchart of FIG. 9) to produce crate content data (step 1009). The content data (step 1009) can be used to identify product and quantity thereof based on crate identity as disclosed in steps 1005 and 1011. Consequently, a relationship can be created between the unique identity of the entering and exiting packing crates, and the contents thereof, thus, a query (step 1008) to said coupled database (step 1007) requesting the difference of the sum of product entering the storage area (step 1004) and the sum of product leaving the storage area (step 1010) can describe the inventory level of said storage area.

Figure 11:
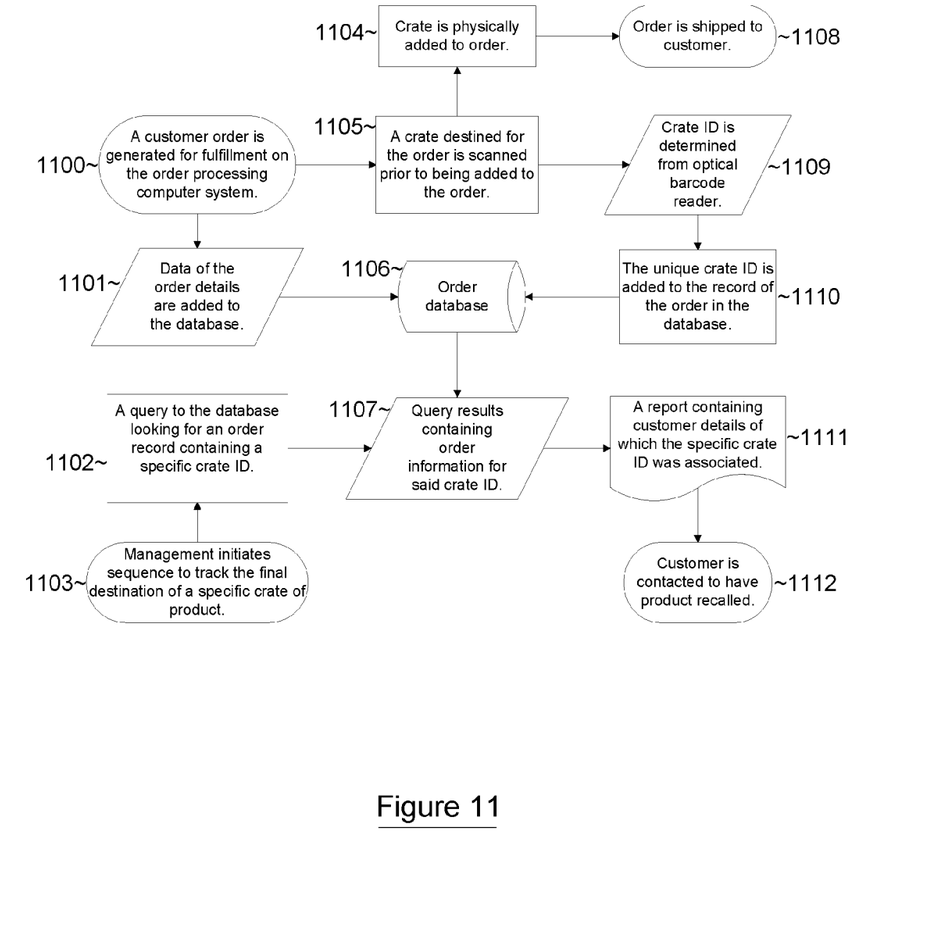
FIG. 11 is a flowchart depicting the process involved in tracking specific crate contents forward to an identifiable customer.

FIG. 11 is a flowchart illustrating one embodiment of a method for tracking a specific crate of product to a customer. The method can comprise the process of affixing optical barcode reader 602 in proximity to an in-feed conveyor (step 1105) of an order fulfillment workstation. The optical barcode reader can read the crates (step 1105), can capture unique identifier data (step 1109) and can further create records (step 1110) of said data in a coupled computerized database (step 1106). In some embodiments, customer order data can be recorded (step 1101) in said database (step 1106) with an association to crate identifications used to fulfill said order. In the event that management would like to recall the final destination of a specific crate (step 1103), a query (step 1102) can be made to the database (step 1106) with the crate identity to produce the recipient data sought (step 1111).

Although a few preferred embodiments have been shown and described, it will be appreciated by those skilled in the art that various changes and modifications might be made without departing from the scope of the invention. It is known by those skilled in the art that alternate names and devices exist that could be used in place of an optical barcode reader and produce equivalent results and meaning such as vision sensor, smart camera, vision system, machine vision, optical scanner, barcode scanner, scanner, and barcode sensor. It is known by those skilled in the art that alternate names exist that could be used in place of two-dimensional barcode and produce equivalent meaning such as barcode, unique identifier, identifying code, unique indicia, identifying mark, unique mark, machine readable code, optical pattern, optically encoded pattern, dot code, optical code, and visible pattern. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments of the invention in which an exclusive property or privilege is claimed are defined as follows:

1. A method for identifying and tracking a reusable packing crate for carrying products, the method comprising the steps of:
   a) applying an identifier code on at least one sidewall of the crate by producing a two-dimensional barcode pattern through the at least one sidewall;
   b) reading the identifier code;
   c) storing the identifier code in a computerized database;
   d) storing data relating to the crate and the products contained therein on the database; and
   e) associating the stored data with the identifier code.

2. The method set forth in claim 1, wherein the producing of the barcode pattern further comprises the step of drilling the two-dimensional pattern through the at least one sidewall.

3. The method as set forth in claim 2, wherein the barcode is selected from a list of available barcodes stored on the database.

4. The method as set forth in claim 3, further comprising the step of removing the barcode from the list of available barcodes when the barcode is applied to the crate.

5. The method as set forth in claim 4, further comprising the step of placing the barcode back into the list of available barcodes after the crate has been removed from service or destroyed.

6. The method as set forth in claim 2, wherein the identifier code further comprises a Data Matrix code or a Dot Code A code.

7. The method as set forth in claim 2, wherein the step of reading the identifier code further comprises illuminating the barcode with light and reading the light reflecting off of the crate with an optical barcode reader.

8. The method as set forth in claim 7, wherein the light is selected from one or both of the group consisting of visible light and infrared light.

9. The method as set forth in claim 1, further comprising the step of accessing the data stored in the database and using the accessed data to control a production line process.

10. The method as set forth in claim 9, further comprising the step of using the accessed data to control a manufacturing or operations management process of the production line process.

11. The method as set forth in claim 1, wherein the data stored on the database further comprises location data related to the location of the crate in a production line process.

12. The method as set forth in claim 11, further comprising the step of accessing the location data stored in the database and using the accessed location data to control the production line process in response to the location of the crate in the production line process.

13. The method as set forth in claim 12, further comprising the step of using the accessed location data to control a manufacturing or operations management process of the production line process.

14. The method as set forth in claim 1, further comprising the step of applying the identifier code on a second sidewall of the crate by producing the two-dimensional barcode pattern through the second sidewall.

15. The method as set forth in claim 1, wherein the step of reading the identifier code further comprises illuminating the barcode with infrared light and reading the light reflecting off of the crate with an infrared light reader.

16. A system for identifying and tracking a reusable packing crate for carrying products, comprising:
   a) means for applying an identifier code on at least one sidewall of the crate, the identifier code comprising a two-dimensional barcode pattern produced through the at least one sidewall;
   b) means for reading the identifier code;
   c) means for storing the identifier code in a computerized database;
   d) means for storing data relating to the crate and the products contained therein on the database; and
   e) means for associating the stored data with the identifier code.

17. The system as set forth in claim 16, wherein the two-dimensional barcode pattern is produced by drilling though the at least one sidewall.

18. The system as set forth in claim 16, wherein the barcode is selected from a list of available barcodes stored on the database.

19. The system as set forth in claim 18, further comprising means for removing the barcode from the list of available barcodes when the barcode is applied to the crate.

20. The system as set forth in claim 19, further comprising means for placing the barcode back onto the list of available barcodes after the crate has been removed from service or destroyed.

21. The system as set forth in claim 16, wherein the identifier code further comprises a Data Matrix code or a Dot Code A code.

22. The system as set forth in claim 16, further comprising means for illuminating the barcode with light and reading the light reflecting off of the crate with an optical barcode reader.

23. The system as set forth in claim 22, wherein the light is selected from one or both of the group consisting of visible light and infrared light.

24. The system as set forth in claim 16, further comprising means for accessing the data stored in the database and for using the accessed data to control a production line process.

25. The system as set forth in claim 24, further comprising means for using the accessed data to control a manufacturing or operations management process of the production line process.

26. The system as set forth in claim 16, wherein the data stored on the database further comprises location data related to the location of the crate in a production line process.

27. The system as set forth in claim 26, further comprising means for accessing the location data stored in the database and for using the accessed location data to control the production line process in response to the location of the crate in the production line process.

28. The system as set forth in claim 27, further comprising means for using the accessed location data to control a manufacturing or operations management process of the production line process.

* * * * *